US009802831B2

(12) United States Patent
Goel et al.

(10) Patent No.: US 9,802,831 B2
(45) Date of Patent: Oct. 31, 2017

(54) SYNTHESIS OF HIGH SILICA ZEOLITE VIA INTERZEOLITE TRANSFORMATION WITHOUT OSDAS

(71) Applicants: Sarika Goel, Berkeley, CA (US); Stacey Ian Zones, San Francisco, CA (US); Enrique Iglesia, Moraga, CA (US)

(72) Inventors: Sarika Goel, Berkeley, CA (US); Stacey Ian Zones, San Francisco, CA (US); Enrique Iglesia, Moraga, CA (US)

(73) Assignees: Chevron U.S.A. Inc., San Ramon, CA (US); The Regents of the University of California, Oakland, CA (US)

( * ) Notice: Subject to any disclaimer, the term of this patent is extended or adjusted under 35 U.S.C. 154(b) by 0 days.

(21) Appl. No.: 14/708,896

(22) Filed: May 11, 2015

(65) Prior Publication Data
US 2016/0023912 A1 Jan. 28, 2016

Related U.S. Application Data

(60) Provisional application No. 62/028,265, filed on Jul. 23, 2014.

(51) Int. Cl.
*C01B 39/38* (2006.01)
*C01B 39/02* (2006.01)

(52) U.S. Cl.
CPC ............ *C01B 39/38* (2013.01); *C01B 39/023* (2013.01)

(58) Field of Classification Search
None
See application file for complete search history.

(56) References Cited

U.S. PATENT DOCUMENTS

| | | | | |
|---|---|---|---|---|
| 3,691,099 A | * | 9/1972 | Young | B01J 29/084 423/714 |
| 3,733,391 A | * | 5/1973 | Hoffman | B01J 29/08 423/710 |
| 3,906,076 A | * | 9/1975 | Goytisolo | C01B 33/2815 423/710 |
| 5,154,904 A | * | 10/1992 | Kleinschmit | C01B 39/20 423/709 |
| 5,951,963 A | * | 9/1999 | He | B01J 29/85 423/709 |
| 2001/0020416 A1 | * | 9/2001 | Yoshikawa | H01G 9/12 95/45 |
| 2004/0047803 A1 | | 3/2004 | Valtchev | |
| 2004/0200758 A1 | * | 10/2004 | Yang | B01J 20/186 208/208 R |
| 2011/0118107 A1 | * | 5/2011 | Garcia-Martinez | B01J 29/04 502/62 |
| 2011/0171121 A1 | * | 7/2011 | Senderov | C01B 39/026 423/704 |
| 2012/0264992 A1 | * | 10/2012 | Hurst | B01J 20/18 585/824 |
| 2012/0269719 A1 | | 10/2012 | Moden et al. | |
| 2013/0165315 A1 | | 6/2013 | Al-Khattaf | |

FOREIGN PATENT DOCUMENTS

| | | | |
|---|---|---|---|
| EP | 0753484 A1 | | 1/1997 |
| KR | 20060109898 | * | 11/2006 |
| WO | 2010/146156 A1 | | 12/2010 |
| WO | 2011062256 | * | 5/2011 |

OTHER PUBLICATIONS

J. Scherzer. "Dealuminated Faujasite-type structures with Si2/Al2O3 ratios over 100", Journal of Catalysis, vol. 54, No. 2, pp. 285-288 (1978).*
Zones, S.I. "Conversion of Faujasites . . . Iodide". J. Chem. Soc. Faraday Trans., 87 (22), 3709-3716 (1991).*
Nedyalkova, Radka, et al. "Interzeolite Conversion of FAU type zeolite into CHA and its Application in NH3-SCR". Competence Center for Catalysis, Chemical Engineering. Sweden (2013).*
Itakura, Masaya, et al. "Synthesis of high-silica CHA type zeolite by interzeolite conversion of FAU type zeolite in the presence of seed crystals". Microporous and Mesoporous Materials. 91-96, 144 (2011).*
K. Honda et al., "Influence of seeding on FAU-*BEA interzeolite conversions", Microporous and Mesoporous Materials, 2011, vol. 142, pp. 161-167.
A. Yashiki et al., "Hydrothermal conversion of FAU zeolite into LEV zeolite in the presence of non-calcined seed crystal", Journal of Crystal Growth, 2011, vol. 325, pp. 96-100.
K. Iyoki et al., "Progress in seed-assisted synthesis of zeolites without using organic structure-directing agents", Microporous and Mesoporous Materials, 2013, vol. 189, pp. 22-30.
N. Yamanaka et al., "Acid stability evaluation of CHA-type zeolites synthesized by interzeolite conversion of FAU-type zeolite and their membrane application for dehydration of acetic acid aqueous solution", Microporus and Mesoporous Materials, 2012, vol. 158, pp. 141-147.
M. Itakura et al., "Synthesis of high-silica CHA type zeolite by interzeolite conversion of FAU type zeolite in the presence of seed crystals" Microporus and Mesoporous Materials, 2011, vol. 144, pp. 91-96.
S. Goel et al., "Synthesis of zeolites via interzeolite transformations without organic structure-directing agents", Chemistry of Materials, 2005, vol. 27, pp. 2056-2066.
International Search Report from corresponding International Application No. PCT/US2015/041596, dated Oct. 26, 2015.
S. Goel et al., "Synthesis and Catalytic Consequences of Metal and Oxide Clusters Encapsulated within Zeolites", University of California at Berkeley, 1 page.
T. Sano et al.,"High Potential of Interzeolite Conversion Method for Zeolite Synthesis", Journal of the Japan Petroleum Institute, 2013, vol. 56, No. 4, pp. 183-197.

(Continued)

Primary Examiner — Melvin C Mayes
Assistant Examiner — Sheng H Davis
(74) Attorney, Agent, or Firm — E. Joseph Gess; Melissa M. Hayworth

(57) ABSTRACT

Provided is a method for preparing a zeolite having a Si/Al ratio of at least 10 by interzeolite transformation in the absence of an organic structure directing agent. The method is more cost effective and less equipment intensive as it eliminates the costly organic structure directing agent and the waste treatment at the plant.

11 Claims, 13 Drawing Sheets

(56) References Cited

OTHER PUBLICATIONS

R. Nedyalkova et al., "Interzeolite Conversion of FAU Type Zeolite into CHA and its Application in NH3-SCR", Top Catal, 2013, vol. 56, pp. 550-557.
A. Yashiki et al., "Hydrothermal conversion of FAU zeolite into LEV zeolite in the presence of non-calcined seed crystals", Journal of Crystal Growth, 2011, No. 325, pp. 96-100.
S. Goel et al., "Encapsulation of Metal Clusters within MFI via Interzeolite Transformations and Direct Hydrothermal Syntheses and Catalytic Consequences of Their Confinement", Journal of the American Chemical Society, 2014, vol. 136, pp. 15280-15290.
Sigmund M. Csicsery, "Shape-selective catalysis in zeolites", Zeolites, 1984, vol. 4, pp. 202-213.
M. D. Oleksiak et al., "Synthesis of zeolites in the absence of organic structure-directing agents: factors governing crystal selection and polymorphism", Rev. Chem. Eng., 2014, vol. 30, No. 1, pp. 1-49.
Mark E. Davis, "Ordered porous materials for emerging applications", Review Article, 2002, vol. 417, pp. 813-821.
M. Maldonado et al., "Controlling Crystal Polymorphism in Organic-Free Synthesis of Na-Zeolites", Journal of the American Chemical Society, 2013, vol. 135, pp. 2641-2652.
K. Itabashi et al., "A Working Hypothesis for Broadening Framework Types of Zeolites in Seed-Assisted Synthesis without Organic Structure-Directing Agent", Journal of the American Chemical Society, 2012, vol. 134, pp. 11542-11549.
P.-S. Lee et al., "Sub-40 nm Zeolite Suspensions via Disassembly of Three-Dimensionally Ordered Mesoporous-Imprinted Silicalite-1", Journal of the American Chemical Society, 2011, vol. 133, pp. 493-502.
S. I. Zones, "Conversion of Faujasites to High-silica Chabazite SSZ-13 in the Presence of N,N,N-Trimethyl-1-adamantammonium Iodide", Journal of the Chemical Society Faraday Trans., 1991, vol. 87, No. 22, pp. 3709-3716.
X. Meng et al., "Green Routes for Synthesis of Zeolites", Chemical Reviews, 2014, vol. 114, pp. 1521-1543.
C. S. Cundy et al., "The Hydrothermal Synthesis of Zeolites: History and Development from the EarlieSt Days to the Present Time", Chemical Review, 2003, vol. 103, pp. 663-701.
M. Moliner et al., "Synthesis Strategies for Preparing Useful Small Pore Zeolites and Zeotypes for Gas Separations and Catalysis", Chem. Mater., 2014, vol. 26, pp. 246-258.
B. Xie et al., "Organotemplate-Free and Fast Route for Synthesizing Beta Zeolite", Chem. Mater., 2008, vol. 20, No. 14, pp. 4533-4535.
H. Jon et al., "An Insight into the Process Involved in Hydrothermal Conversion of FAU to *BEA Zeolite", Chem. Mater., 2008, vol. 20, pp. 4135-4141.
K. Iyoki et al., "Broadening the Applicable Scope of Seed-Directed, Organic Structure-Directing Agent-Free Synthesis of Zeolite to Zincosilicate Components: A Case of VET-Type Zincosilicate Zeolites", Chem. Mater., 2014, vol. 26, pp. 1957-1966.
Mark E. Davis, "Zeolites from a Materials Chemistry Perspective", Chem. Mater., 2014, vol. 26, pp. 239-245.
Z. Wu et al., "Organic Template-Free Synthesis of ZSM-34 Zeolite from an Assistance of Zeolite L Seeds Solution", Chem. Mater., 2008, vol. 20, No. 2, pp. 357-359.
J. Dhainaut et al., "One-pot structural conversion of magadiite into MFI zeolite nanosheets using mononitrogen surfactants as structure and shape-directing agents", CrystEngComm, 2013, vol. 15, pp. 3009-3015.
L. V. Tendeloo et al., "Alkaline cations directing the transformation of FAU zeolites into five different framework types", Chem. Commun., 2013, vol. 49, pp. 11737-11739.
B. Xie et al., "Seed-directed synthesis of zeolites with enhanced performance in the absence of organic templates", Chem. Commun., 2011, vol. 47, pp. 3945-3947.
P. B. Weisz et al., "Catalysis by Crystalline Aluminosilicates II. Molecular-Shape Selective Reactions", Journal of Catalysis, 1962, vol. 1, pp. 307-312.
A. Corma et al., "Issues in the Synthesis of Crystalline Molecular Sieves: Towards the Crystallization of Low Framework-Density Structures", Chem. Phys. Chem., 2004, vol. 5, pp. 304-313.
Y. Kamimura et al., "OSDA-free synthesis of MTW-type zeolite from sodium aluminosilicate gels with zeolite beta seeds", Microporous and Mesoporous Materials, 2012, vol. 163, pp. 282-290.
Y. Kamimura et al., "Seed-assisted, OSDA-free synthesis of MTW-type zeolite and "Green MTW" from sodium aluminosilicate gel systems", Microporous and Mesoporous Materials, 2012, vol. 147, pp. 149-156.
C. S. Cundy et al., "The hydrothermal synthesis of zeolites: Precursors, intermediates and reaction mechanism", Microporous and Mesoporous Materials, 2005, vol. 82, pp. 1-78.
M. Itakura et al., "Synthesis of high-silica CHA type zeolite by interzeolite conversion of FUA type zeolite in the presence of seed crystals", Microporous and Mesoporous Materials, 2011, vol. 144, pp. 91-96.
M. Itakura et al., "Synthesis of high-silica offretite by the interzeolite conversion method", Materials Research Bulletin, 2010, vol. 45, pp. 646-650.
Supplementary European Search Report dated Apr. 11, 2017 corresponding EP application EP 15824521.

\* cited by examiner

SYNTHESIS OF HIGH SILICA ZEOLITE VIA INTERZEOLITE TRANSFORMATION WITHOUT OSDAS

CROSS-REFERENCE TO RELATED APPLICATIONS

The present application claims priority to provisional application 62/028,265 filed on Jul. 23, 2014, the disclosure of which is expressly incorporated herein by reference in its entirety.

FIELD OF THE INVENTION

The present invention relates to a method of preparing zeolites without the use of an organic structure directing agent. More specifically, the method involves interzeolite transformation without an organic SDA.

BACKGROUND

Aluminosilicate zeolites are crystalline microporous solids with diverse framework structures and void networks constructed by arrangements of $SiO_4^{4-}$ and $AlO_4^{5-}$ tetrahedral units. These materials are widely used in adsorption, catalysis, and ion-exchange processes. Zeolites are typically synthesized by hydrothermal treatment of amorphous aluminosilicate gels in the presence of inorganic (e.g. $Na^+$, $K^+$, etc.) or organic structure-directing agents (OSDA) in hydroxide or fluoride media. OSDA reagents, in particular, increase the cost and the environmental burden of many large-scale zeolite syntheses.

Much effort has been devoted to the development of OSDA-free synthesis protocols to decrease such costs and the emission of toxic species in the gaseous and water streams generated during the synthesis or the subsequent treatments required to decompose organic species contained within zeolite voids. Recently, several groups have reported improved protocols for seed-assisted hydrothermal synthesis of zeolites from amorphous aluminosilicate gels without the use of OSDA species. These methods use large concentrations of alkali cations to stabilize the target frameworks and, as a result, have succeeded mostly in the synthesis of Al-rich frameworks (Si/Al<10). Similar protocols remain unavailable for OSDA-free synthesis of target zeolites (e.g., CHA, STF, MTW, MFI etc.) with lower Al contents, which are often preferred because of their greater structural and acid site stability. In some instances, it is simply not possible to grow a given zeolite structure of interest (e.g., STF, MTW, etc.) at conditions with a Si/Al of less than 10, or even 7.

Zeolites are kinetically (but not thermodynamically) stable towards conversion to denser framework structures (e.g. α-quartz). As a result, their synthesis often involves the formation of structures of intermediate stability in the course of forming the ultimate target structures, which are often rendered stable only by the use of specific organic or inorganic cations. Transformations of one zeolite structure into another one—interzeolite transformations—have been explored because they can provide a strategy for the selective synthesis of specific structures, often with shorter synthesis times. The mechanistic details of such interzeolite transformations, however, remain unclear and predictions of their success largely empirical.

Most reported interconversions use OSDA moieties to induce the nucleation of frameworks that are in fact of lower framework densities and thus less stable than the parent zeolite, or to form structures that would not form at all without the presence of an OSDA. Several studies have used seeds to assist the formation of desired structures without the aid of OSDA species; others have induced interzeolite transformations in the presence of both seeds and OSDA. Successful interzeolite transformations without either seeds or OSDA have been reported only for zeolites with low Si/Al ratios (Si/Al ratio of less than 10, generally from 2-5). To date, target materials with higher Si/Al ratios (Si/Al>10) do not appear to have been synthesized via interzeolite transformations without the aid of OSDA species.

Providing a more facile and cost effective method for synthesizing high silica zeolites would be of great value to the catalysis industry.

SUMMARY OF THE INVENTION

Accordingly, provided is a method of converting lower framework density zeolites into high Si/Al ratio zeolites having a higher framework density value, without the use of an organic SDA. The method comprises providing the lower framework density zeolite to be converted into the higher framework density zeolite, and then converting the lower framework density zeolite into a high Si/Al ratio zeolite, e.g., a ratio of at least 10. The conversion is conducted in the absence of an OSDA. The conversion is generally achieved by direct hydrothermal synthesis. This process eliminates the costly SDA and the waste treatment at the plant. The process is therefore more cost efficient and less equipment intensive.

In essence, the present inventors have developed a strategy and a set of guiding rules for organic structure-directing agent (OSDA)-free synthesis of zeolites via interzeolite transformation protocols. More specifically, as an example, high-silica MFI (ZSM-5), CHA (chabazite), STF (SSZ-35) and MTW (ZSM-12) zeolites can be synthesized from FAU (faujasite) or BEA (beta) parent zeolites via these methods. The successful transformations require that kinetic hurdles are overcome while exploiting the thermodynamic tendency of microporous materials to increase their framework density (FD). Kinetic barriers to interzeolite transformations are overcome for zeolites without common composite building units (CBU) between parent and daughter zeolites through the use of seeds. The use of seeds are not generally required when the starting and final structures share CBU components in common. These interzeolite transformation phenomena appear to be pseudomorphic in nature. The conversions conserve the volume occupied by the parent crystals and lead to similar size and crystal shape in the daughter materials. Such phenomena reflect that the incipient nucleation of the new structures occur at the outer regions of the parent crystals and lead to the nucleation of mesoporosity during transformations, as a natural consequence of the space-conserving nature of the structural changes and of the higher density of the daughter frameworks.

DETAILED DESCRIPTION OF EMBODIMENTS

Figures 1A, 1B:
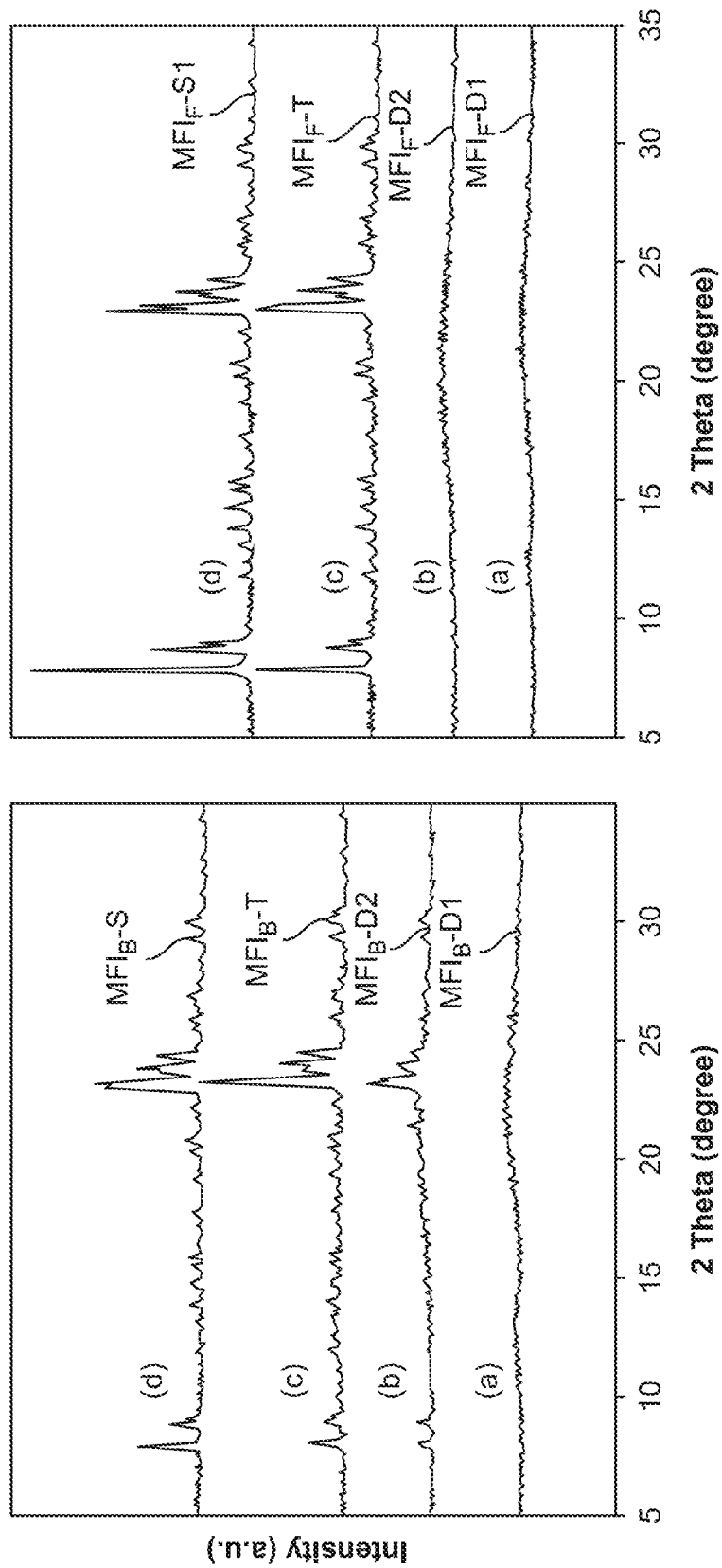
FIGS. 1A and 1B show X-Ray diffractograms of the products synthesized from parent BEA (FIG. 1A) and FAU (FIG. 1B) via (a, b) direct, (c) template-assisted and (d) seed-assisted (using MFI seeds ($S_1$)) transformations. The synthesis was carried out at 423 K, $NaOH/SiO_2$=0.35 (from BEA FIG. 1A) and $NaOH/SiO_2$=0.5 (from FAU FIG. 1B) and $H_2O/SiO_2$=65 (from BEA FIG. 1A) and $H_2O/SiO_2$=95 (from FAU FIG. 1B) (Table 1).

The present method prepares a zeolite having a Si/Al ratio of at least 10. The method comprises providing a first zeolite, e.g., a parent zeolite, and then converting the first zeolite to a second zeolite, or target zeolite, having a higher framework density than the first zeolite, and a Si/Al ratio of at least 10. The Si/Al ratio of the second zeolite obtained upon conversion can be, for example, in the range of from 11-25, or can be 40 or greater. The entire conversion is conducted in the absence of an organic structure directing agent (OSDA).

By the absence of an organic structure directing agent is meant that the synthesis is free of soluble OSDA. The present synthesis need not use an OSDA reagent as in conventional synthesis. Thus there is no soluble OSDA in the synthesis. While seeds of a zeolite can be used, i.e., such seeds being as-made materials, externally added, it has been found that the SDA that may be associated with the seeds is trapped in the interior of the zeolites, and cannot get out of the zeolite to impact the synthesis. In other words, the new zeolite is not nucleated by liberated SDA from the seeds. There is no liberated SDA from the seeds, and the synthesis remains free of soluble SDA.

The conversion is generally conducted in a basic solution under hydrothermal conditions. The temperature used in the conversion process can be above the crystallization temperature of the first zeolite. The pH of the basic solution is greater than 7, and can range up to 11, or even 13. Seed crystals of the second zeolite can aid in the conversion, and are generally added to the first zeolite either prior to or during the conversion.

In one embodiment, the first zeolite comprises BEA or FAU. In one embodiment, the second zeolite comprises ZSM-5, SSZ-35, ZSM-12 or chabazite.

The present invention therefore, provides a method of synthesis of high-silica zeolites, where the Si/Al is at least 10, 11-25, and even at least 40. MFI, CHA, STF and MTW zeolites can be synthesized by the present OSDA-free interzeolite transformation methods. Parent zeolites, e.g., BEA, framework density (FD) 15.3; defined as T atom/$nm^3$, where T stands for Si or Al atoms in the zeolite framework, or FAU, FD 13.3, can be transformed into target daughter structures such as MFI (FD 18.4), CHA (FD 15.1), STF (FD 16.9) and MTW (FD 18.2) via recrystallization in aqueous NaOH at hydrothermal conditions. Structures with lower framework densities can be successfully transformed into more stable high silica structures with higher framework densities. The framework density (FD) value can be an absolute value or a normalized value on the basis of a theoretical all-silica framework structure. Either can be used as the relative values will be consistent for reflecting higher or lower framework density values.

Concomitant kinetic hurdles can require the presence of a common CBU between parent and target structures or, in their absence, the addition of seeds. The addition of seeds can also secure the desired target structure. A plausible synthesis mechanism, pseudomorphic in nature, for seed-assisted transformations is consistent with the observed effects of the parent Si/Al ratio, the NaOH/$SiO_2$ ratio, and the required synthesis temperature and time, as well as with the crystal habit and intracrystal mesoporous voids in the daughter structures. The resulting concepts and strategies provide predictive guidance for synthesizing a broad range of zeolite frameworks in the direction dictated by thermodynamics and with kinetics mediated by either common structural units along the reaction coordinate or by seeds of the target product.

The general requirements for a successful transformation of parent to product zeolite are summarized as follows: (1) the target zeolite should be of higher framework density than the parent zeolite because the ascending framework density scale in the transformations due to thermodynamically-favored high framework density structures, (2) a target zeolite should be added as seed material in the synthesis, when the parent structure and desired product do not share common CBU, (3) the seeds generally would not be required in the presence of common CBU components as long as the synthesis conditions are optimized for the desired zeolite, (4) the use of high-silica parent zeolites is important because Si/Al ratio determine their ability to restructure and form high-silica product zeolites by pseudomorphic transformation approach, and in one embodiment, the FAU zeolite source has a Si/Al greater than 10, (5) the synchronization of the spalling of the seed fragments and restructuring of parent zeolite is required for successful transformations, (6) the $NaOH/SiO_2$ and Si/Al ratios of the synthesis gel play a key role in such synchronization and should be optimized because the parent or seed zeolites should not dissolve completely prior to their interaction with each other to nucleate the desired structure, and (7) the chemical composition of gel and synthesis conditions should be optimized, further, to get pure and highly crystalline zeolite products. The validity of these requirements is confirmed by the synthesis of high-silica CHA (FD 14.5), STF (FD 17.3) and MTW (FD 19.4) zeolites via interzeolite transformations of FAU (FD 13.3).

In practicing the present method, a balance of the conditions and components can provide improved products. For example, the NaOH content is balanced with the time and temperature used in the synthesis method. In the synthesis, in general, the silica and alumina are contributed by the source zeolite (e.g., FAU) and any seeds. When seeds are used, they can be greater than 5 wt % in the synthesis. The $NaOH/SiO_2$ ratio generally ranges from 0.25-1.00, and the $H_2O/SiO_2$ ratio is generally greater than 50. The time for the synthesis in one embodiment ranges from about 10 to about 80 hours, and in one embodiment, the temperature can range from about 130 to about 160° C. The zeolite product made is generally metastable so too much of a given factor can result in a cascade reaction effect where a product with higher framework density than the desired product may result. For example, prolonged heating in some of the reactions can produce mixtures of quartz and mordenite, an aggregated denser product than what may be desired. Thus a balancing is needed to optimize the desired result, which one of ordinary skill in the art can do based on the discussion herein and the examples set for the below.

The following examples are provided for purposes of illustration of the present process, and are not meant to be limiting.

EXAMPLES

Materials used in the examples include fumed $SiO_2$ (Cab-O-Sil, HS-5, 310 $m^2$ $g^{-1}$), NaOH (99.995%, Sigma Aldrich), FAU (CBV780, Zeolyst, H-FAU, Si/Al=40), FAU (CBV712, Zeolyst, $NH_4$-FAU, Si/Al=6), BEA (CP811E-75, Zeolyst, H-BEA, Si/Al=37.5), BEA (CP814E, Zeolyst, $NH_4$-BEA, Si/Al=12.5), and tetrapropylammonium bromide (TPABr, 98%, Sigma Aldrich) were used as received.
Seeds In a typical synthesis, 649 g of water, 740 g of 1 mol $dm^{-3}$ NaOH (Baker Reagent), 98 g of tetrapropylammonium bromide (Kodak Chemicals) were added to 872 g of Ludox AS-30 colloidal $SiO_2$ (Dupont). The synthesis mixture was then transferred into a Hastelloy-lined stainless steel autoclave (3.8 $dm^3$), pressure tested and held at 423 K for 4 days in a convection oven under rotation (78 rpm). After 4 days, the autoclave was cooled, and the resulting solid was collected by filtration and washed with deionized water (17.9 MΩ·cm resistivity) until the rinse liquids reached a pH of 7-8. The resulting product was crystalline MFI (confirmed by powder X-ray diffraction (XRD)) with Si/Al~300 (by Inductively-coupled plasma atomic emission spectroscopy (ICP-AES) analysis) and ~6µ sized zeolite crystals (by transmission electron microscopy (TEM)). These MFI seeds ($S_1$) were used in all seed-assisted interzeolite transformations from FAU to MFI unless mentioned otherwise. MFI ($S_2$) was synthesized by dissolving $Al(OH)_3$ (53% $Al_2O_3$, Reheis F-2000 dried gel, 0.44 g) in a solution containing deionized $H_2O$ (38 g), tetrapropyl ammonium hydroxide (TPAOH, 40 wt %, Aldrich, 7.5 g) and KOH (1 M solution in deionized $H_2O$, Fisher, 15 g). Ludox AS-30 colloidal silica (18 g) was added to the solution and the mixture was then transferred into a Teflon-lined stainless steel autoclave (Parr, 125 $cm^3$) and held at 423 K for 3 days under static conditions. The resulting solids were collected by filtration through a fritted disc Buchner filter funnel (Chemglass, 150 ml, F) and washed with deionized water (17.9 MΩ·cm resistivity) until the rinse liquids reached a pH of 8-9 and the sample was heated in convection oven at 373 K overnight. In the present examples, the material used as seeds were prepared using previously described synthesis procedures for CHA[1], STF[2] and MTW[3] zeolites. See, (1) Zones, S. I. U.S. Pat. No. 8,007,763 B2, Aug. 30, 2011, (2) Musilova-Pavlackova, Z., Zones, S. I., Cejka, J. Top. Catal. 2010, 53, 273; (3) Jones, A. J., Zones, S. I., Iglesia, E. J. Phys. Chem. C 2014, 118, 17787.

Example 1

In a typical synthesis, zeolite BEA or FAU was added (0.5-1.0 g) to an aqueous NaOH solution, into which the MFI seed crystals or structure-directing agents (TPABr) were added to prepare final mixtures with molar compositions listed in Table 1. These mixtures were placed within sealed polypropylene containers (Nalgene, 125 $cm^3$) and homogenized by vigorous magnetic stirring (400 rpm; IKA RCT Basic) for 1 h at ambient temperature. The mixture was then transferred into a Teflon-lined stainless steel autoclave and held at 423 K for 24-40 h under static conditions. The resulting solids were collected by filtration through a fritted disc Buchner filter funnel (Chemglass, 150 ml, F) and washed with deionized water (17.9 MΩ·cm resistivity) until the rinse liquids reached a pH of 8-9. The sample was heated in a convection oven at 373 K overnight. The solid yields of the resulting products were defined as $$\text{Yield (\%)} = \frac{\text{Product (g)}}{\text{Parent zeolite (g)} + \text{seeds (g)}} \times 100 \quad (1)$$

The samples were then treated in a tube furnace in flowing dry air (1.67 $cm^3$ $g^{-1}$ $s^{-1}$) to 773 K at 0.03 K $s^{-1}$ and held at this temperature for 3 h. The samples, after treatment, were denoted as $MFI_B$-D, $MFI_B$-T, $MFI_B$-S, when synthesized from BEA, and $MFI_F$-D, $MFI_F$-T, $MFI_F$-S, when synthesized from FAU, in the direct (-D), template-assisted (-T), and seed-assisted (-S) interzeolite transformations, respectively.

TABLE 1

Initial synthesis molar compositions, product phase, yield, and final pH of samples for synthesis of MFI[a].

| Sample Name | Parent zeolite (Si/Al) | NaOH/ SiO$_2$[b] | H2O/ SiO$_2$[b] | Time (h) | Additional (OSDA/Seed)[c] | Product[d] (Si/Al) | Final pH | Yield[e] (%) |
|---|---|---|---|---|---|---|---|---|
| MFI$_B$-D1 | BEA(12.5) | 0.35 | 65 | 24 | — | Am. | — | — |
| MFI$_B$-D2 | BEA(37.5) | 0.35 | 65 | 24 | — | MFI (22) | 11.8 | 46 |
| MFI$_B$-T | BEA(37.5) | 0.35 | 65 | 24 | TPABr (0.05)[f] | MFI (35) | 12.5 | 47 |
| MFI$_B$-S | BEA(37.5) | 0.35 | 65 | 24 | 10% wt. MFI Seeds | MFI (23) | 11.8 | 47 |
| MFI$_F$-D1 | FAU(6) | 0.50 | 95 | 40 | — | Am. | — | — |
| MFI$_F$-D2 | FAU(40) | 0.50 | 95 | 40 | — | Am. | — | — |
| MFI$_F$-T | FAU(40) | 0.50 | 95 | 40 | TPABr (0.05)[f] | MFI (33) | 12.5 | 58 |
| MFI$_F$-S1 | FAU(40) | 0.50 | 95 | 40 | 10% wt. MFI Seeds | MFI (22) | 11.8 | 47 |
| MFI$_F$-S2 | FAU(40) | 0.23 | 95 | 40 | 10% wt. MFI Seeds | MFI (42) | 11.7 | 76 |
| MFI$_F$-S3 | FAU(40) | 0.85 | 95 | 40 | 10% wt. MFI Seeds | MFI (11) | 12.0 | 18 |

[a]T = 423K for all the syntheses.
[b]Reported values excludes the SiO$_2$ amount present in seed materials.
[c]
$$\text{Seed (wt. \%)} = \frac{\text{Seed material (g)}}{\text{Parent zeolite (g)}} \times 100$$

[d]Am. = Amorphous
[e]
$$\text{yield (\%)} = \frac{\text{Product (g)}}{\text{Parent zeolite (g) + seed (g)}} \times 100$$

[f]Values in parentheses show molar composition of TPABr relative to SiO2 amount of parent zeolite.

Example 2

The synthesis of CHA, STF, and MTW zeolites was achieved by interzeolite transformations of FAU as parent zeolite. FAU (0.5-1.0 g) was added to an aqueous NaOH solution to achieve molar compositions of x NaOH: 1.0 SiO$_2$: 0.0125 Al$_2$O$_3$: 95H$_2$O (x=0.50, 0.68, 0.85), into which 10% wt. (% wt. based on parent FAU) seed crystals (CHA, STF, or MTW) were added to prepare final mixtures with molar compositions listed in Table 2. These mixtures were placed within sealed polypropylene containers (Nalgene, 125 cm$^3$) and homogenized by vigorous magnetic stirring (400 rpm; IKA RCT Basic) for 1 h at ambient temperature. These mixtures were then transferred into a Teflon-lined stainless steel autoclave and held at the desired crystallization temperature (423, 428, or 433 K) for 40 h under static conditions. The resulting solids were collected by filtration through a fritted disc Buchner filter funnel (Chemglass, 150 ml, F) and washed with deionized water (17.9 MΩ·cm resistivity) until the rinse liquids reached a pH of 7-8. The samples were heated in a convection oven at 373 K overnight. The samples were then treated in tube furnace in flowing dry air (1.67 cm$^3$ g$^{-1}$ s$^{-1}$) to 873 K at 0.03 K s$^{-1}$ and held at this temperature for 3 h. The resulting samples after treatment were denoted as CHA$_F$-S, STF$_F$-S, MTW$_F$-S, synthesized via interzeolite transformations of FAU using seeds of CHA, STF, and MTW, respectively.

For the synthesis of the H-form of these zeolites, the treated Na-zeolites were added to an aqueous NH$_4$NO$_3$ solution with stirring at 353K for 4 h. The process was repeated two more times to recover NH$_4$-zeolites, which was treated in a tube furnace in flowing dry air (1.67 cm$^3$ g$^{-1}$ s$^{-1}$) to 873K at 0.03 K s$^{-1}$ for 3 h to form H-zeolite.

TABLE 2

Initial synthesis molar compositions, product phase, yield, and final pH of samples for transformations of FAU using CHA, STF and MTW seeds[a].

| Sample Name | Parent (Si/Al) | NaOH/ SiO$_2$[b] | Temp (K) | Seeds[c] (10% wt.) | Product Phase[d] | Product (Si/Al) | Final pH | Yield[e] (%) | Crystallinity (%) |
|---|---|---|---|---|---|---|---|---|---|
| CHA$_F$-S1 | FAU(40) | 0.50 | 423 | CHA | CHA + Am. | 19 | 11.8 | 46 | 50 |
| CHA$_F$-S2 | FAU(40) | 0.68 | 423 | CHA | CHA + Am. | 11 | 11.7 | 25 | 66 |
| CHA$_F$-S3 | FAU(40) | 0.85 | 423 | CHA | CHA + MOR | | 12.2 | 22 | |
| CHA$_F$-S4 | FAU(40) | 0.50 | 428 | CHA | CHA + Am. | | 11.9 | 49 | |
| STF$_F$-S1 | FAU(40) | 0.50 | 423 | STF | STF + Am. | | 11.8 | 47 | |
| STF$_F$-S2 | FAU(40) | 0.50 | 428 | STF | STF + Am. | | 11.8 | 48 | |
| STF$_F$-S3 | FAU(40) | 0.50 | 433 | STF | STF + MFI | | 12.0 | 52 | |
| STF$_F$-S4 | FAU(40) | 0.68 | 423 | STF | STF + AM | 11 | 11.7 | 26 | 78 |
| STF$_F$-S5 | FAU(40) | 0.85 | 423 | STF | STF + MOR | | 12.0 | 33 | |
| MTW$_F$-S1 | FAU(40) | 0.50 | 423 | MTW | MTW + Am. | | 11.9 | 44 | |
| MTW$_F$-S2 | FAU(40) | 0.50 | 428 | MTW | MTW + Am. | | 11.8 | 48 | |
| MTW$_F$-S3 | FAU(40) | 0.68 | 423 | MTW | MTW + Am. | 12 | 12.0 | 29 | 60 |

[a]H$_2$O/SiO$_2$ = 95 and synthesis time = 40 h for all the syntheses.
[b]Reported values excludes the SiO2 amount present in seed materials.
[c]
$$\text{Seed (wt. \%)} = \frac{\text{Seed material (g)}}{\text{Parent zeolite (g)}} \times 100$$

[d]Am. = Amorphous
[e]
$$\text{yield (\%)} = \frac{\text{Product (g)}}{\text{Parent zeolite (g) + seed (g)}} \times 100$$

Example 3

The identity and phase purity of the product zeolites were demonstrated by powder XRD measurements (Cu Kα radiation λ=0.15418 nm, 40 kV, 40 mA, Bruker D8 Advance). Diffractograms were collected for 2θ values of 5-35° at 0.02° intervals with a 2 s scan time. Si, Al, and Na contents of the samples were measured by ICP-AES (IRIS Intrepid spectrometer; Galbraith Laboratories). TEM images were taken on Philips/FEI Tecnai 12 microscope operated at 120 kV. Before TEM analysis, the samples were suspended in ethanol and dispersed onto ultrathin carbon/holey carbon films supported on 400 mesh Cu grids (Ted Pella Inc.). Argon (Ar) adsorption-desorption measurements of zeolite products were performed on Quantachrome Autosorb-1 at 87 K. Prior to the measurements, all samples were degassed at 623 K for 4 h under vacuum. The final pH values were measured at ambient temperature using an Orion Ross combination electrode (Orion 8103BNUMP) with an Orion Star A215 meter (calibrated using buffer solutions of pH 7.00, 10.01 and 12.00).

Example 4

Parent BEA zeolites with low Si content (Si/Al=12.5) formed only amorphous solids in aqueous NaOH (NaOH/$SiO_2$=0.35, $H_2O/SiO_2$=65; Table 1) at 423 K under hydrothermal conditions (X-ray diffractogram; FIG. 1A (a), apparently because MFI frameworks preferentially form in gels with high Si/Al contents, because abundant five-membered rings in MFI are disfavored at high Al contents.

MFI crystals readily formed, however, from parent BEA zeolites with lower Al contents (Si/Al=37.5; (X-ray diffractogram; FIG. 1A (b), 46% yield (Eq. 1); Table 1), in aqueous NaOH solution (NaOH/$SiO_2$=0.35, $H_2O/SiO_2$=65; Table 1) under autogenous pressures at 423 K. Interestingly, this transformation occurred spontaneously, without requiring the presence of any seeds or OSDA. The Si/Al ratio in the MFI product (Si/Al=22; Table 1) was much lower than in the parent BEA (Si/Al=37.5) and the solids yield was 46% (Table 1) suggesting that nearly all of the Al in the parent BEA was incorporated into the product MFI, whereas some $SiO_2$ remained dissolved in solution. Crystalline MFI was obtained (X-ray diffractograms; FIG. 1A (c) and FIG. 1A (d), 47% yield (Eq. 1) for both, also, from template-assisted (with TPABr) and seed-assisted (with 10% wt. MFI seeds) transformations of parent BEA (Si/Al=37.5). Thus, it can be concluded that parent BEA with high Si content (Si/Al=37.5) transformed to MFI spontaneously and in the individual presence of MFI seeds or OSDA at Si/Al ratios in the parent BEA that favor MFI frameworks.

It is noted that the framework structures and composite building units (CBU) of the parent BEA and product MFI include a common mor structural motif. It seems plausible, therefore, that a CBU, present in BEA and required to form MFI, remains essentially intact within BEA-derived intermediates during the conversion of BEA to MFI. This CBU may assist the local nucleation of MFI and in doing so, minimize inherent kinetic hurdles and allow BEA to MFI transformations to occur without seeds or OSDA. This common CBU serves as a kinetic mediator for nucleating the daughter structure, suggesting that zeolites containing common CBU may be able to overcome kinetic barriers that obstruct their interconversions in the direction dictated by the thermodynamic tendency of zeolites to form structures with greater framework densities. MFI zeolites were obtained after 24 h from parent BEA zeolites (FIG. 1A), while hydrothermal MFI syntheses from amorphous aluminosilicate gels, with or without OSDA, typically require 2-15 days. Thus, the presence of the BEA structure, plausibly because of its common CBU with MFI, shortens synthesis times because of more rapid nucleation.

Example 5

Parent FAU zeolites with Si/Al ratios of 6 and 40 gave only amorphous solids in hydrothermal aqueous NaOH environments (NaOH/$SiO_2$=0.5, $H_2O/SiO_2$=95; Table 1) at 423 K (X-ray diffractograms; FIG. 1B (a) and FIG. 1B (b), consistent with kinetic hurdles that cannot be overcome in spite of favorable thermodynamics (FAU, FD 13.3; MFI, FD 18.4), possibly because of the lack of common CBU. MFI formed, however, when FAU (Si/Al=40) was treated in similar hydrothermal environments but with MFI seeds in the synthesis mixture (X-ray diffractograms; FIG. 1B (c) and FIG. 1B (d), 58 and 47% yield (Eq. 1), respectively; Table 1). These results contrast the ability of BEA precursors to form MFI even in the absence of such kinetic mediation. Seeds are required in the case of parent FAU zeolites to assist the nucleation of the favored MFI structures.

Figure 2A:
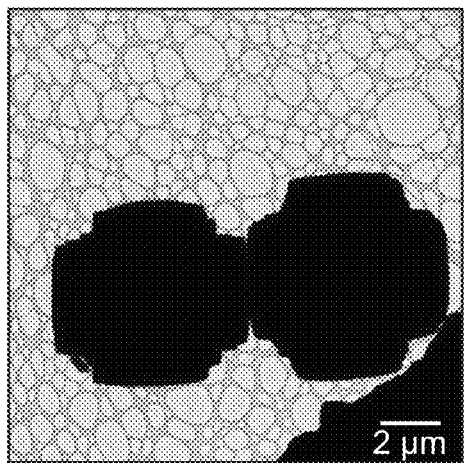
FIGS. 2A, 2B, 2C and 2D show TEM images of MFI seeds $S_1$ (FIG. 2A) and MFI seeds $S_2$ (FIG. 2B) and products synthesized via interzeolite transformations of parent FAU (Si/Al=40) using $S_1$ MFI seeds (FIG. 3C) and $S_2$ MFI seeds (FIG. 2D). The synthesis was carried out at 423 K, NaOH/$SiO_2$=0.5, $H_2O/SiO_2$=95 for 40 h with 10% wt. MFI seeds.
Figure 2B:
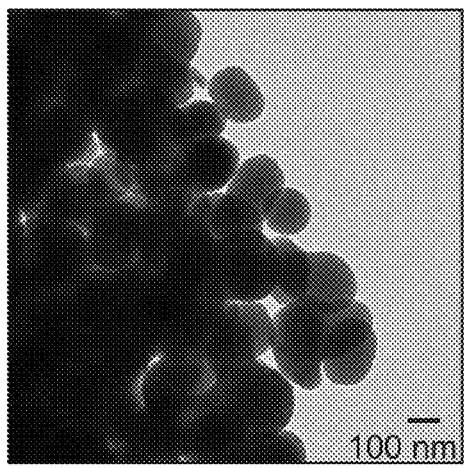
Figure 2C:
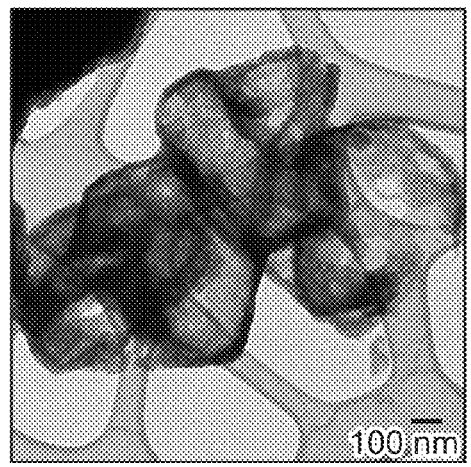
Figure 2D:
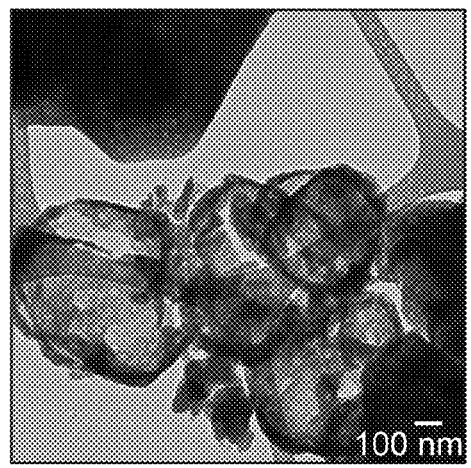
Figure 3:
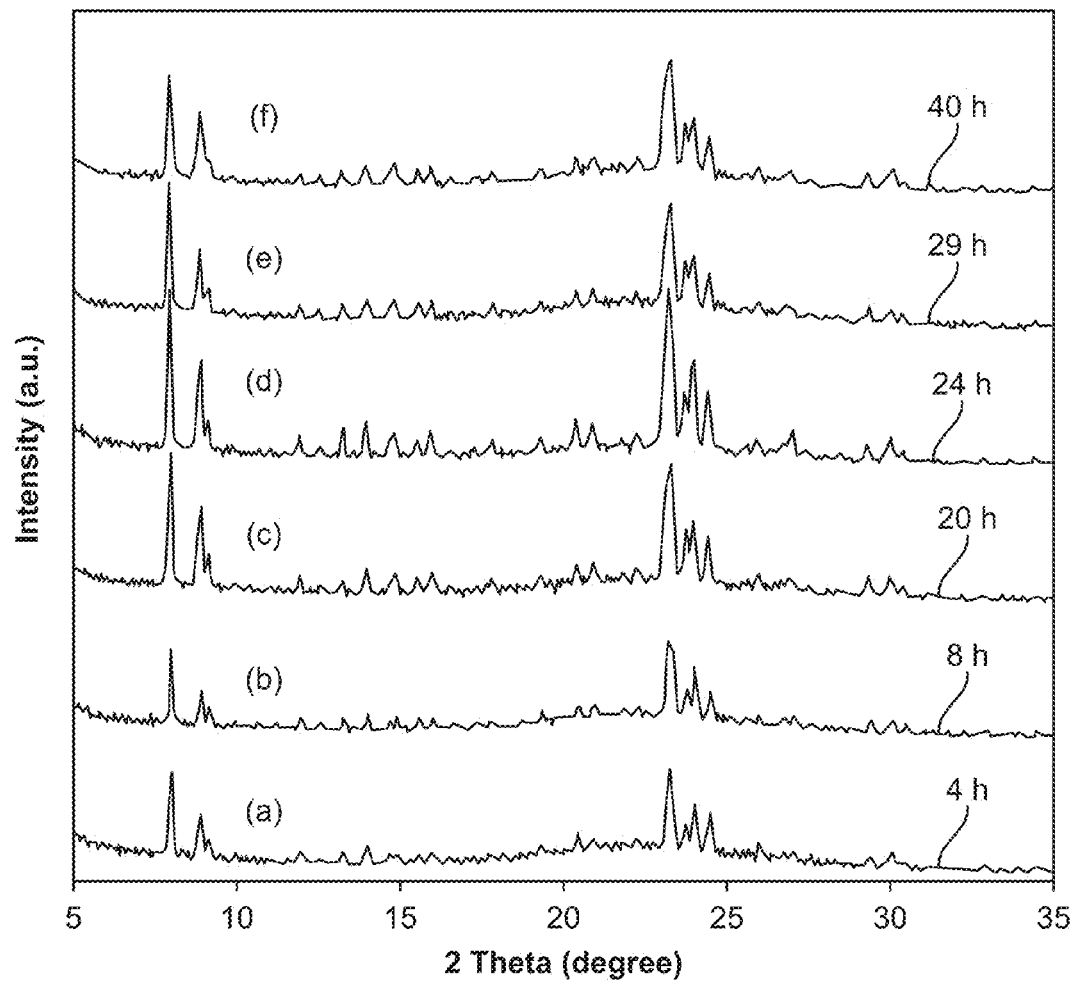
FIG. 3 shows X-Ray diffraction patterns of the products synthesized via seed-assisted transformations of parent FAU (Si/Al=40) for synthesis time of (a) 4 h, (b) 8 h, (c) 20 h, (d) 24 h, (e) 29 h, and (f) 40 h. The synthesis was carried out at 423 K, NaOH/$SiO_2$=0.5, $H_2O/SiO_2$=95 with 10% wt. MFI seeds ($S_1$).

FIGS. 2A, 2B, 2C and 2D show TEM images of two MFI seeds of different crystal size (6 μm; seed $S_1$; FIG. 2A and 0.2 μm; seed $S_2$; FIG. 2B) and of the MFI products formed from FAU parent zeolites using each of these seeds (FIGS. 2C and 2D, respectively). The crystal habit and size of the MFI products using $S_1$ (TEM, FIG. 2C) and $S_2$ (TEM, FIG. 2D) seeds are similar (~0.7 μm diameter) and differ markedly from those of the MFI seeds used (TEM, FIGS. 2A and 2B), which do not remain intact as they mediate MFI nucleation from parent FAU crystals. These seeds do not serve as intact nucleation sites, but instead provide CBU or shed small fragments, as in the case of homogeneous nucleation and growth during seed-assisted hydrothermal synthesis from amorphous aluminosilicate gels. The products crystals are in fact smaller (~0.7 μm crystals, FIG. 2C) than the $S_1$ seed crystals (~6 μm crystals, FIG. 2A), making epitaxial growth of MFI crystals onto seeds implausible.

Figure 4A:
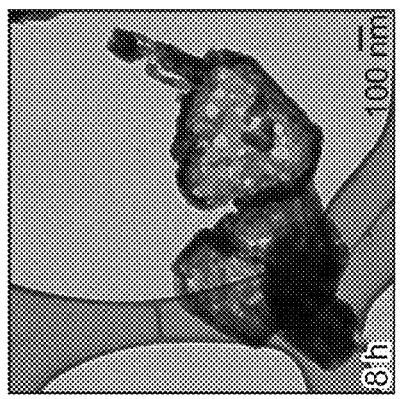
FIGS. 4A-4F show TEM images of the products synthesized via seed-assisted transformations of parent FAU (Si/Al=40) for synthesis time of 0 h (parent FAU) (FIG. 4A), 4 h (FIG. 4B), 8 h (FIG. 4C), 20 h (FIG. 4D), 29 h (FIG. 4E), and 40 h (FIG. 4F).
Figure 4D:
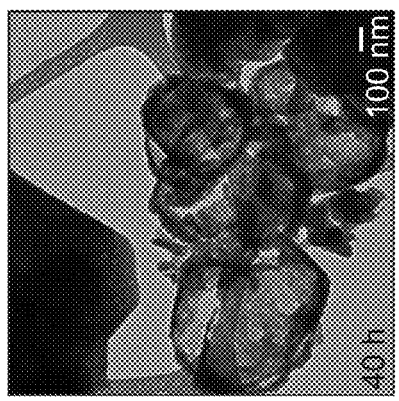
Figure 4B:
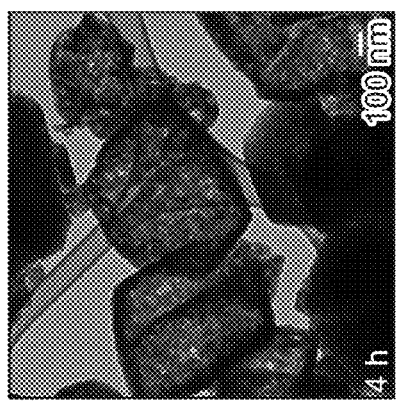
Figure 4E:
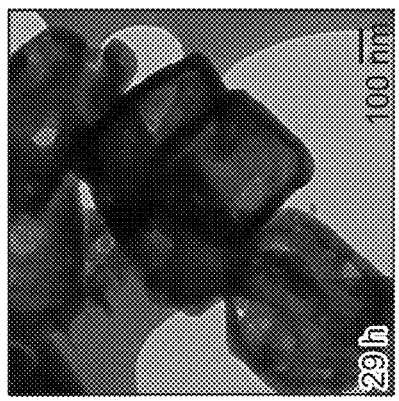
Figure 4C:
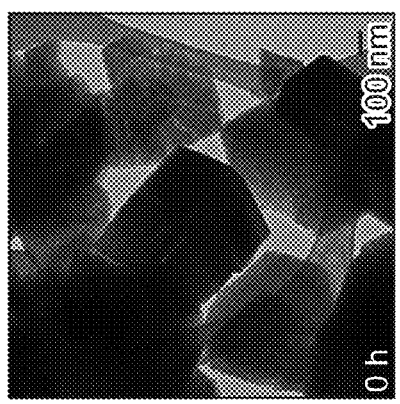
Figure 4F:
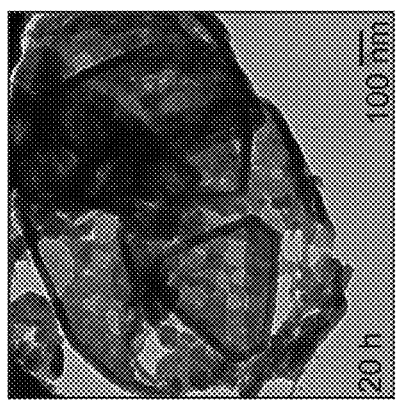
Figure 5:
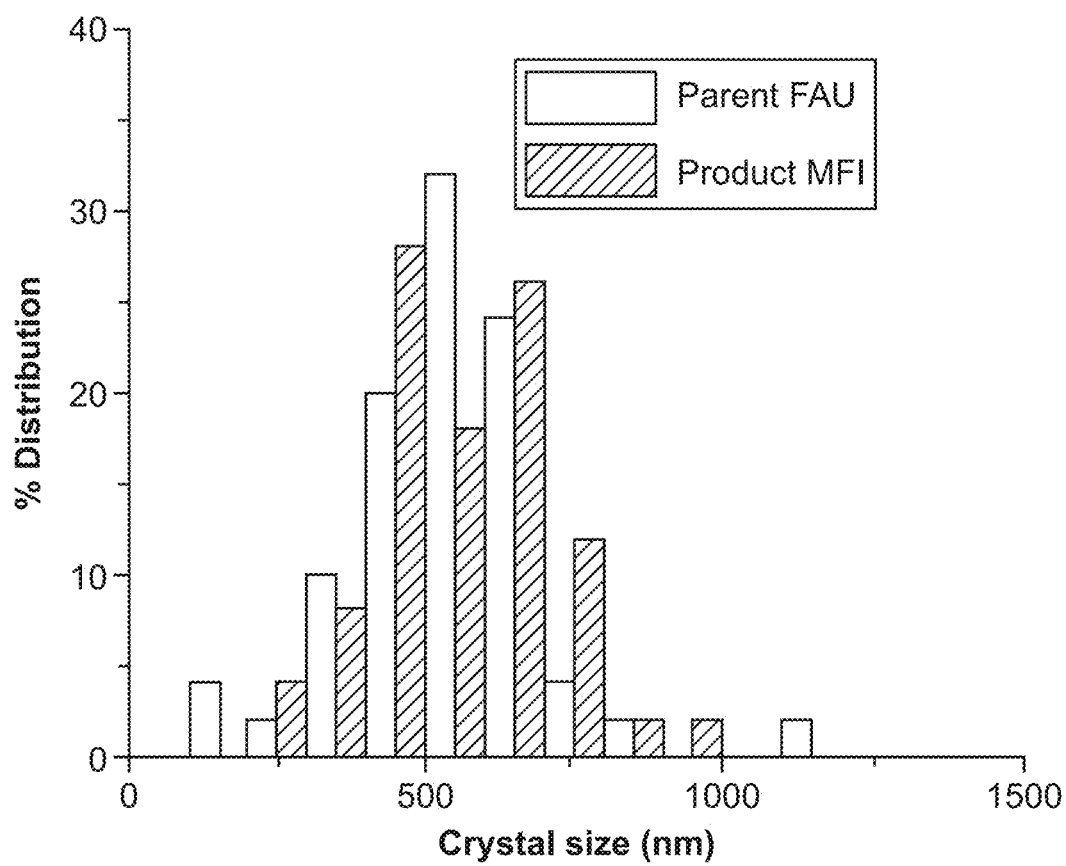
FIG. 5 shows crystal size distributions of the parent FAU and product MFI ($MFI_F$-S1), synthesized via seed-assisted transformations of parent FAU (Si/Al=40). The synthesis was carried out at 423 K, NaOH/$SiO_2$=0.5, $H_2O/SiO_2$=95 for 40 h with 10% wt. MFI seeds ($S_1$).
Figure 13:
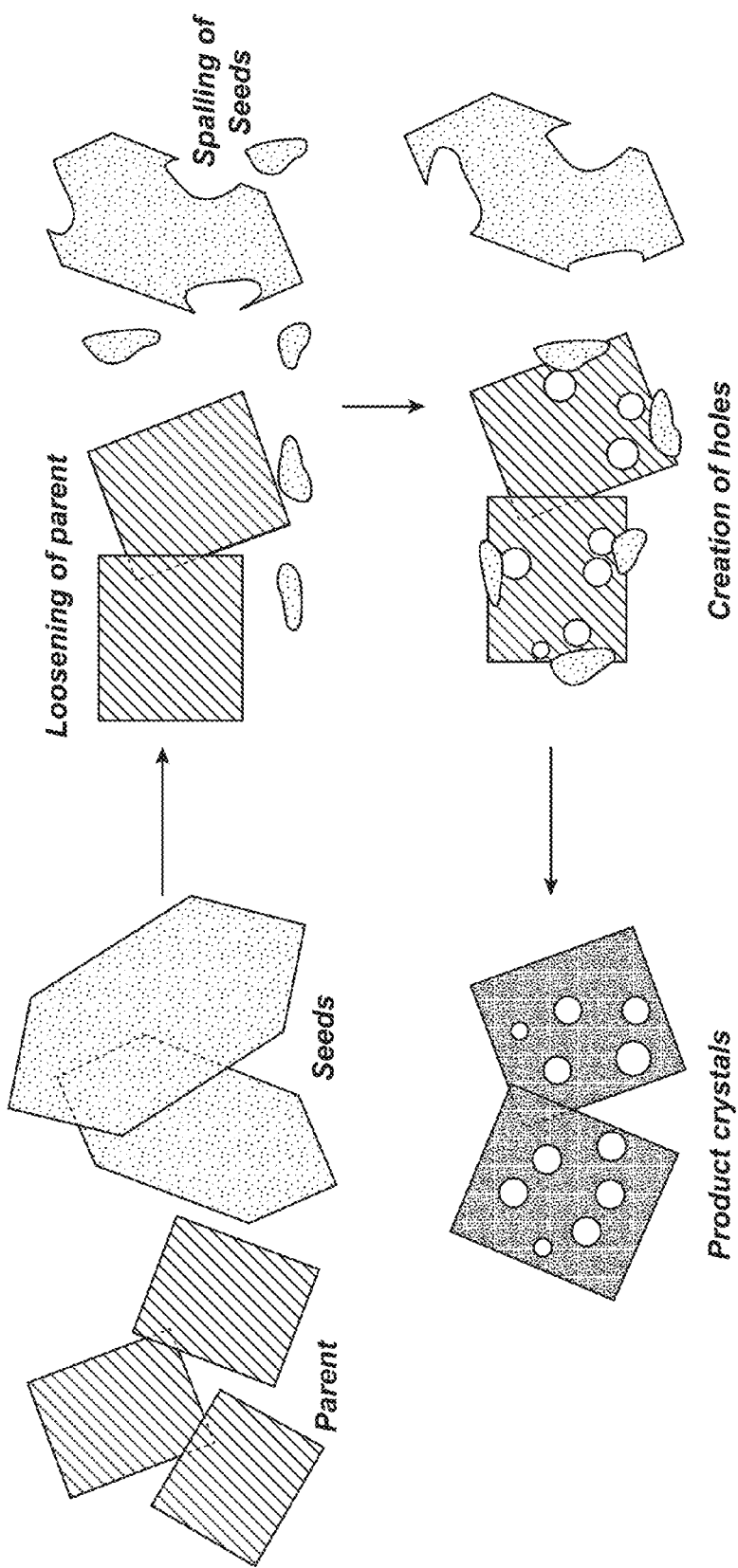
FIG. 13 is a schematic representation of the proposed mechanism of seed-assisted interzeolite transformations of parent FAU to daughter MFI.

FAU diffraction lines disappeared after synthesis times of 4 h, while MFI lines were detectable at all times (4-40 h; FIGS. 3B-3F). The amorphous background in the diffractograms (FIGS. 3A-3F; 2θ=20-30°) disappeared and the MFI diffraction lines were the only discernible features after 24 h. These data indicate that FAU crystals lose their long-range order in the NaOH media in a time scale that still preserves the identity of MFI seeds, which provide essential components for the ultimate recrystallization of FAU parent structures into MFI. The size and shape of MFI crystals, formed from seed-assisted FAU conversion to MFI, did not change significantly during synthesis (4-40 h; TEM; FIGS. 4B-4F) and resemble those of the parent FAU zeolite (TEM; FIG. 4A). MFI mean crystal sizes are only slightly larger than in the FAU parent zeolites (crystal size histograms; FIG. 5). This is consistent with a seed-assisted growth in which FAU structure swell to form structures without local order and spalled MFI fragments from MFI seeds induce the nucleation of MFI frameworks at their outer surfaces, thus fixing an outer crust that preserves the habit and size of the parent crystals (see FIG. 13).

Such volume-conserving (pseudomorphic) transformations reflect the exclusive contact of seed fragments with the outer surface of locally disrupted, but otherwise intact, FAU domains, which nucleate MFI from the outer to the inner regions of these FAU domains. The pseudomorphic nature of these processes requires the nucleation of voids to account for the increase in framework density inherent in FAU to MFI transformations. The mechanistic hypothesis depicted in FIG. 13 suggest that successful transformations would require the synchronization of the local disruption of the FAU structure and the shedding of nucleating fragments from MFI seeds. The requirement for high-silica FAU parent zeolites to form high-silica MFI products implicates such synchronization.

Figure 6:
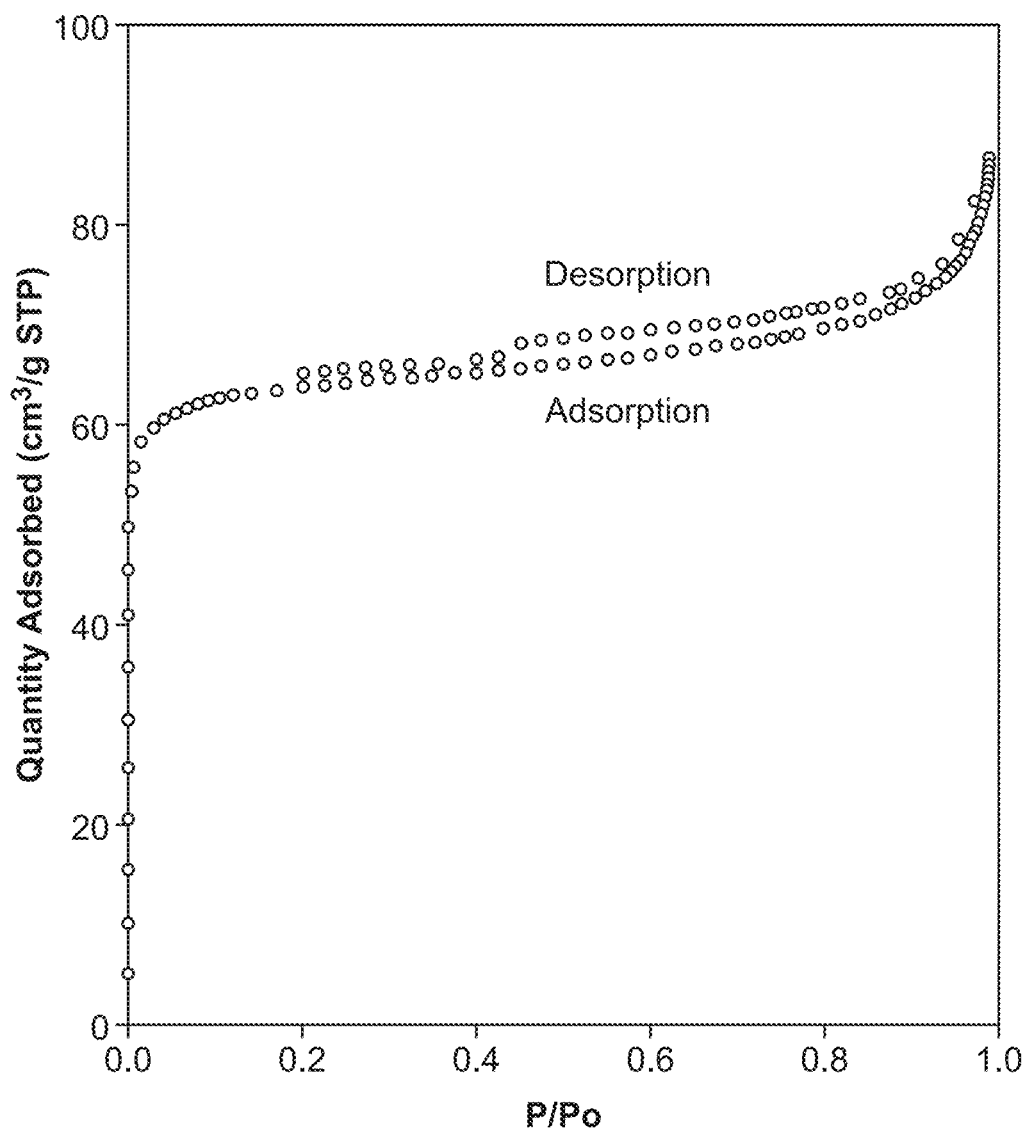
FIG. 6 shows Ar adsorption and desorption profiles for product MFI ($MFI_F$-S1) synthesized via seed-assisted transformations of FAU (Si/Al=40). The synthesis was carried out at 423 K, NaOH/$SiO_2$=0.5, $H_2O/SiO_2$=95 for 40 h with 10% wt. MFI seeds ($S_1$).

Ar adsorption and desorption measurements (FIG. 6) of the product (after 40 h), synthesized from transformations of FAU using MFI seeds, show a hysteresis after $P/P_o$ value of 0.4, which is indicative of the presence of mesopores in the sample. No hysteresis was observed in the Ar adsorption-desorption curves of the product if MFI is grown from a reaction with hydrogel components in the typical zeolite synthesis conditions. These Ar adsorption-desorption measurements, therefore, confirm the presence of mesopores in the MFI product, which is, both, interesting and unique because the mesopores are formed by one-pot synthesis and do not require any post-synthesis treatments such as desilication or dealumination, that are typically used to create mesopores. Such mesopores are useful in practice because they decrease the diffusion distances prevalent for intact crystals.

FAU-derived species retain their physical integrity, and incipient nucleation of the target product structures occurs at the outer regions of the parent crystals by spalled subunits or CBU species derived from MFI seeds, which retain the local MFI structure required to assist the transformation of FAU-derived domains into MFI crystals. The space conserving nature of the transformation requires, in turn, the nucleation of mesoscopic voids within the formed MFI crystals because their framework density is higher than that of the parent FAU.

Example 6

BEA to MFI transformations occur spontaneously, without any significant kinetic hindrance, and even in the absence of MFI seeds. In contrast, MFI seeds are useful to convert FAU to MFI to provide the kinetic mediation required in the absence of any common CBU. Thus, it is plausible that BEA and FAU mixtures, without seeds, can transform to MFI by in-situ generation of MFI seeds or by assistance through mor structural units of BEA (common to MFI).

Figure 7:
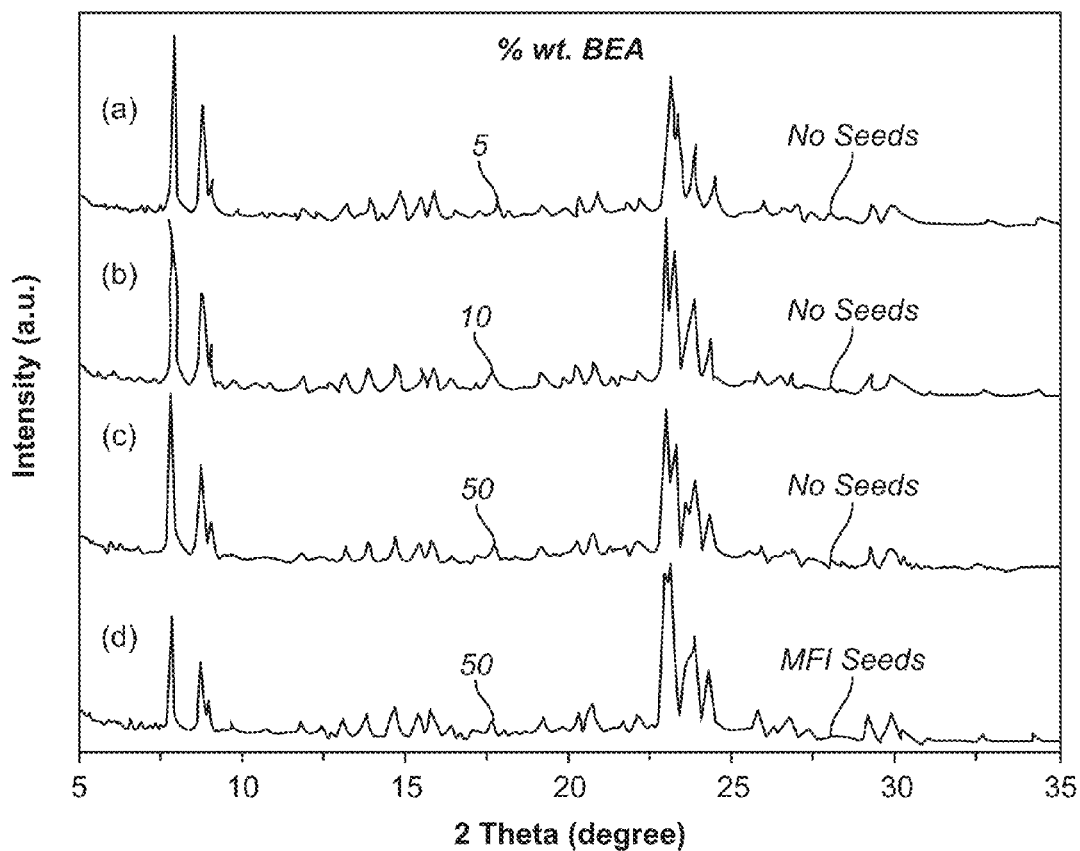
FIG. 7 shows X-Ray diffractograms of the products synthesized via transformations of FAU and BEA mixtures in (a) seed-assisted with 50% BEA and seed-free with (b) 50% (c) 10%, and (d) 5% BEA. The synthesis was carried out at 423 K, NaOH/$SiO_2$=0.45, $H_2O/SiO_2$=80 and 40 h with/without 10% wt. MFI seeds ($S_1$).

MFI products were obtained in the transformations of 50-50% wt. FAU-BEA mixture with 10% wt. MFI seeds (X-ray diffractogram; FIG. 7 (a)), as expected, and also in the direct transformations (X-ray diffractogram; FIG. (b)), in the absence of MFI seeds. MFI products were obtained, further, from transformations of 90-10 and 95-5% wt. FAU-BEA mixtures without seeds (X-ray diffractograms; FIG. 7(c), (d)), with similar yields (46-48%) as those observed in transformations of BEA or FAU alone (46-47%, Table 1).

This data suggest that BEA can assist in the nucleation of MFI from FAU, either by providing the mor structural unit (common to MFI) or by in-situ generation of MFI seeds from direct transformations of BEA.

These results indicate practical applications of interzeolite transformation protocols as this suggest that expensive seed materials or OSDA are not required as long as a source is present that can generate the desired seeds, in-situ, during the synthesis. In addition, these results are consistent with proposed synthesis guidelines, which suggest that the presence of CBU common with product or product seeds, in the synthesis, help to overcome the kinetic barriers for the synthesis of thermodynamically-favored zeolites, denser than parent structures.

Example 7

Figure 8:
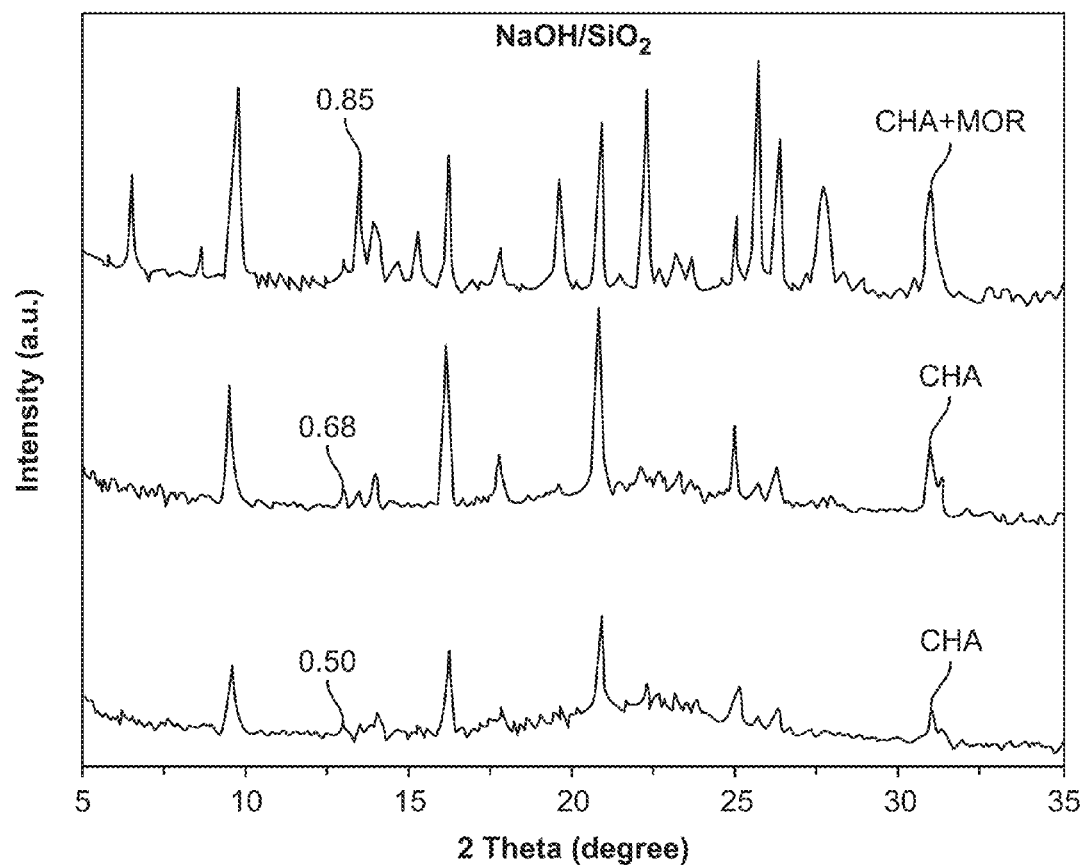
FIG. 8 shows X-Ray diffraction patterns of the products synthesized from transformations of FAU (Si/Al=40) at NaOH/$SiO_2$ ratio of (a) 0.50, (b) 0.68, and (c) 0.85 using 10% wt. CHA seeds. The synthesis was carried out at 423 K, $H_2O/SiO_2$=95 for 40 h.

FAU (Si/Al=40) converted to amorphous solids in the absence of any seeds (0.5NaOH: $1.0SiO_2$: $0.0125Al_2O_3$: $95H_2O$; Table 1), as described previously in Example 5 (X-ray diffractograms; FIGS. 1A and 1B), indicating the synthesis conditions needs to be optimized to be able to get desired crystalline products. In the absence of such optimization, use of CHA seeds in the synthesis should, however, form CHA products. CHA zeolite (Si/Al=19) formed, indeed, by transformations of parent FAU using 10% wt. CHA seeds at 423 K (0.5NaOH: $1.0SiO_2$: $0.0125Al_2O_3$: $95H_2O$; Table 2) for 40 h of synthesis (X-ray diffractogram; FIG. 8). The synthesis conditions (with CHA seeds) are same as those used for BEA or FAU to MFI transformations. The solid yield of the resulting product was 46% (Table 2), which is almost the same as that of MFI synthesized via seed-assisted transformations of FAU or BEA (46-47%; Table 1). The resulting products, however, seem to contain some amorphous solids indicated by the broad background signal in 20-30 degree 2θ range (FIG. 8), suggesting the improper synchronization of decomposition of CHA seeds and parent FAU, apparently because of the lower Si content of CHA seeds (Si/Al=15) than MFI seeds (Si/Al~300), which make CHA harder to decompose at the synthesis conditions (Table 2).

Figure 12:
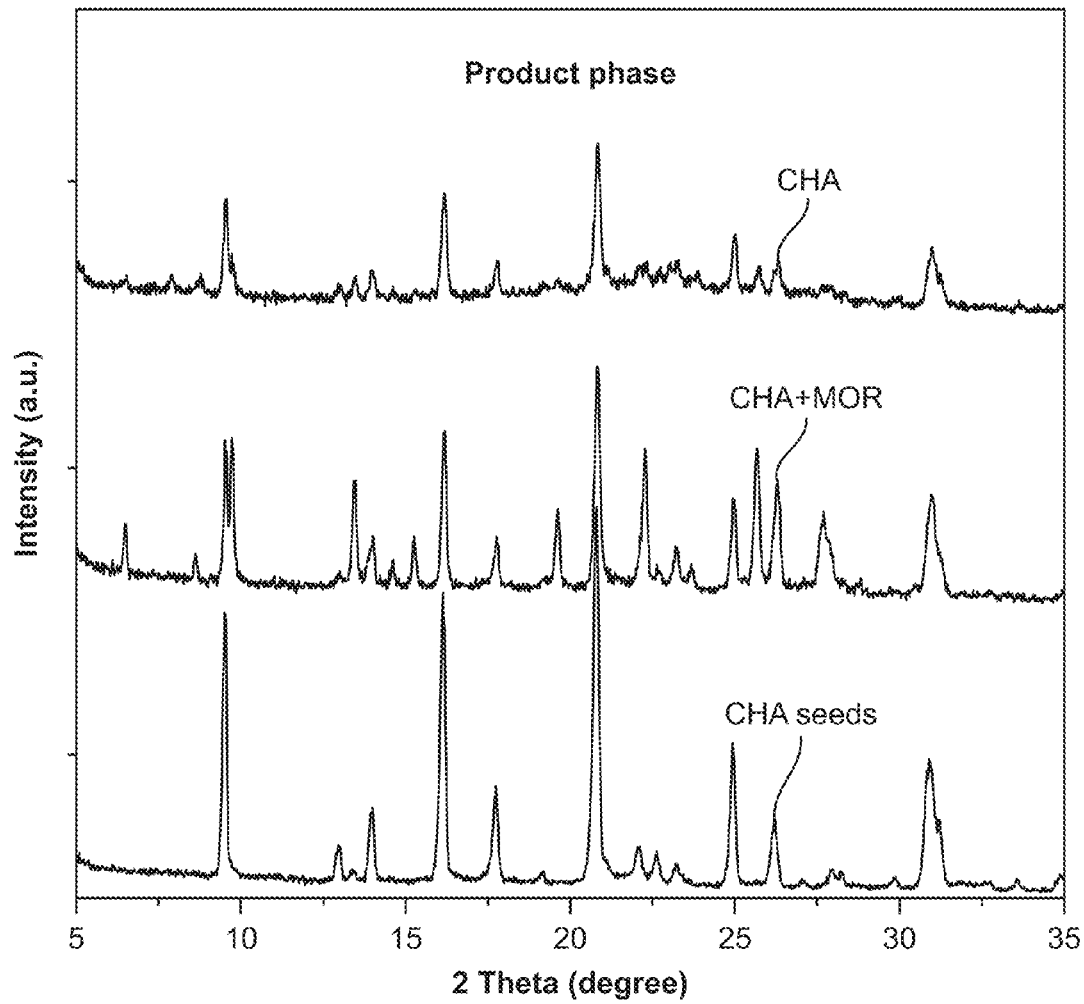
FIG. 12 shows X-Ray diffractograms of (a) CHA seeds and the products synthesized with 10 wt % CHA seeds from (b) amorphous Si and Al sources and (c) parent FAU. Syntheses were carried out at 423 K, 0.68 NaOH: 1.0 $SiO_2$: 0.0125 $Al_2O_3$: 95.0$H_2O$ for 40 h. The solid yield of products was 6% in (b) and 25% in (c).

CHA products formed, also, for $NaOH/SiO_2$ ratio of 0.68 (FIG. 8). The crystallinity of these products (66%; Table 2) was higher than those synthesized at $NaOH/SiO_2$ ratio of 0.50 (50%; Table 2) possibly because of the better synchronization of CHA decomposition and restructuring of FAU due to higher $NaOH/SiO_2$ ratio of the synthesis gel and in turn, high solution pH, which increase the solubility of parent FAU and CHA seed materials. The solid yields (Table 2), in turn, decreased from 46% to 25% and so the Si/Al ratio of product from 19 to 11 also because of the high synthesis pH, at which Si species prefers to be in solution due to high solubility. The increase in the $NaOH/SiO_2$ ratio, further, to 0.85, lead to the formation of MOR phase, as byproduct, along with CHA (FIG. 8), indicating that very high NaOH concentration of the synthesis gel causes rapid nucleation of multiple phases in the solution due to fast dissolution of parent or seed materials, followed by their rapid crystal growth; thus, very high $NaOH/SiO_2$ ratios are undesirable for the formation of pure zeolite phases via these methods. Thus, the synthesis of high-silica CHA (Si/Al=11) was achieved from transformations of FAU with CHA seeds, using the developed synthesis guidelines; there is further scope, however, for optimizing the synthesis parameters to get highly crystalline CHA. Amorphous aluminosilicate gels under similar synthesis conditions (0.68NaOH: $1.0SiO_2$: $0.0125 Al_2O_3$: $95H_2O$) with 10 wt % CHA seeds led to a mixture of CHA and MOR zeolites as products with only 6% yield (Figure S1), confirming that the parent FAU zeolites in these transformations do not dissolve completely and form amorphous aluminosilicate species. The results are shown in FIG. 12.

Example 8

Figures 9A, 9B:
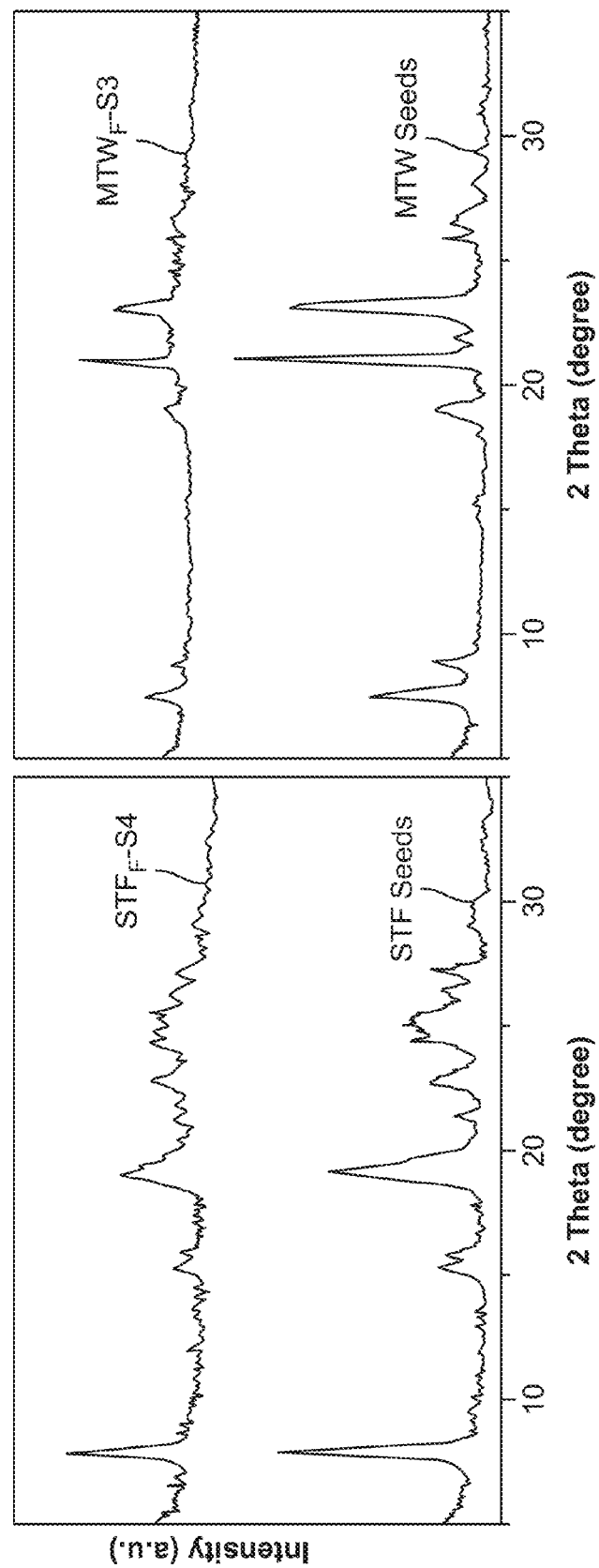
FIG. 9A shows X-Ray diffractograms of the products synthesized via interzeolite transformations of parent FAU (Si/Al=40) with 10% wt. seeds of STF and its corresponding seeds used.
FIG. 9B shows X-Ray diffractograms of the products synthesized via interzeolite transformations of parent FAU (Si/Al=40) with 10% wt. seeds of MTW and its corresponding seeds used. The synthesis was carried out at 423 K, NaOH/$SiO_2$=0.68, $H_2O/SiO_2$=95 for 40 h.

STF and MTW zeolites formed (X-ray diffractograms; FIG. 9) in aqueous NaOH from transformations of parent FAU using STF and MTW seeds, respectively, at 423 K for 40 h of synthesis (0.5NaOH: 1.0SiO$_2$: 0.0125 Al$_2$O$_3$: 95H$_2$O; Table 2), synthesis conditions same as those used for FAU to MFI transformations. The resulting products, however, had poor crystallinity, indicated by broad background for amorphous solids in the diffractograms (FIGS. 9A and 9B). The NaOH/SiO$_2$ ratio of the synthesis gel was, therefore, varied from 0.50-0.85. Results, similar to CHA, were reached for STF and MTW zeolites, where the NaOH/SiO$_2$ ratio of 0.68 resulted in highest crystallinity of pure desired zeolite phases (X-ray diffractograms; FIGS. 9A and 9B). High silica STF (Si/Al=20) and MTW (Si/Al=30) products formed from transformations of FAU (0.68NaOH: 1.0SiO$_2$: 0.0125Al$_2$O$_3$: 95H$_2$O; Table 2) with solid yields of 26% and 29%, respectively (Table 2), which are similar to that of CHA formed from FAU at same synthesis conditions (Si/Al=11, 25% yield, Table 2). The crystallinity of STF and MTW samples were 78 and 60% (Table 2), respectively.

Figure 10:
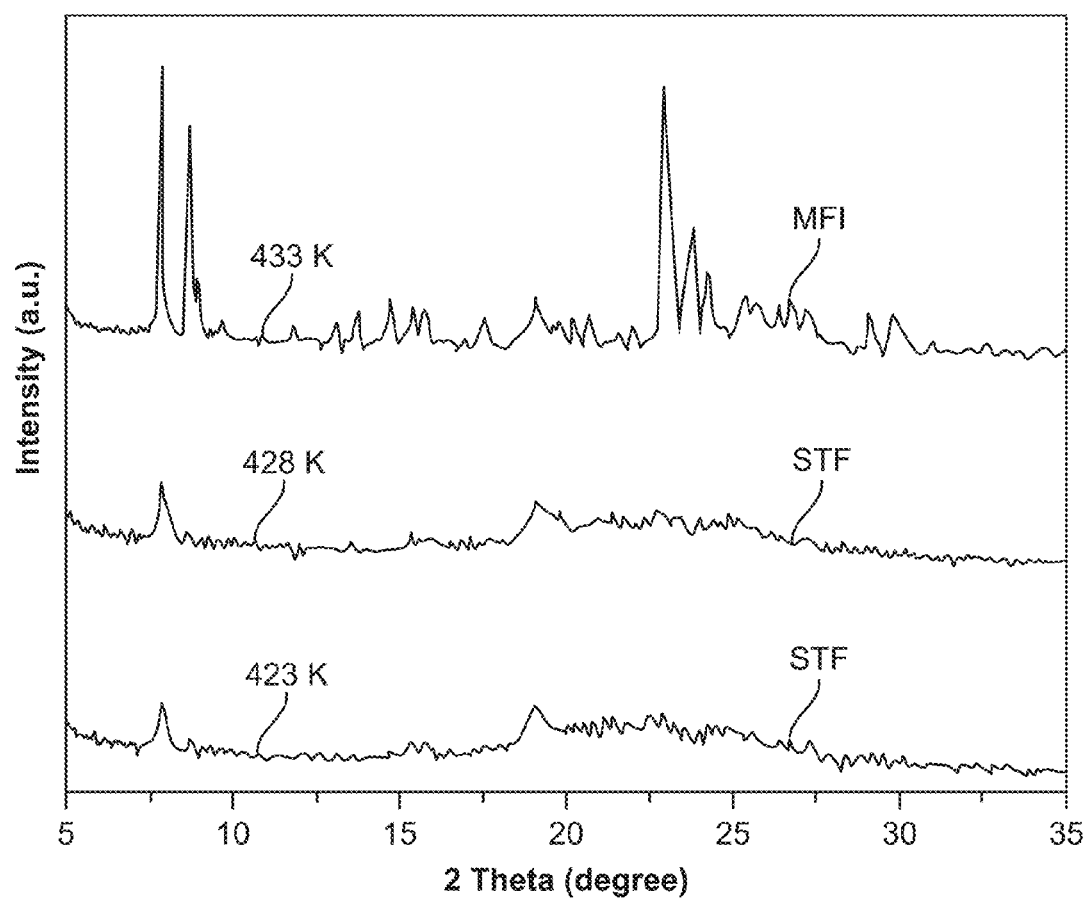
FIG. 10 shows X-Ray diffraction patterns of the products synthesized by seed-assisted transformations of FAU (Si/Al=40) at various temperatures in the presence of 10% wt. STF seeds. The synthesis was carried out at NaOH/$SiO_2$=0.5, $H_2O/SiO_2$=95 for 40 h.
Figure 11:
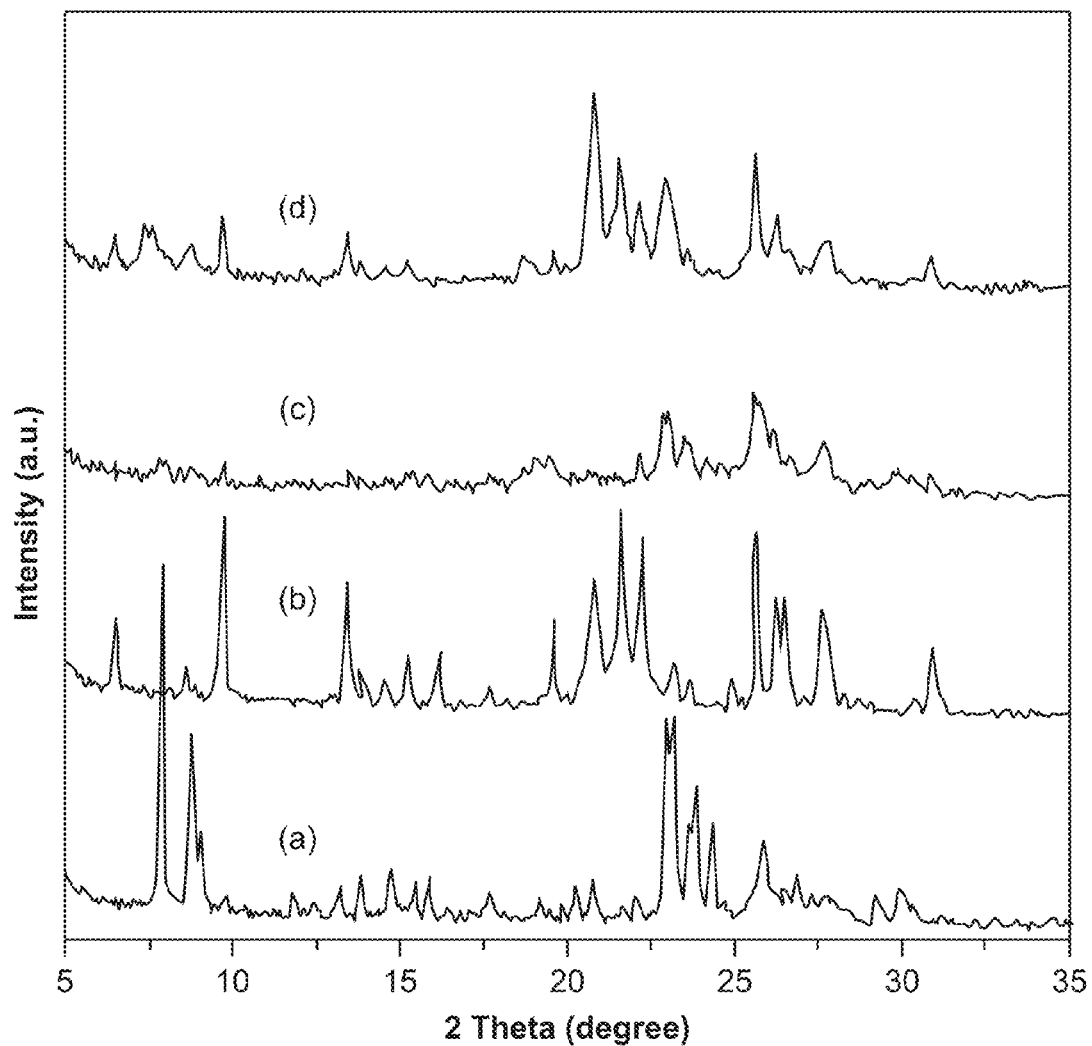
FIG. 11 shows X-Ray diffractograms of the products synthesized via seed-assisted transformations of FAU (Si/Al=40) using 10 wt % (a) MFI, (b) CHA, (c) STF and (d) MTW seeds for synthesis time of 10 days. Syntheses were carried out at 423 K, NaOH/$SiO_2$=0.5 (for MFI) and 0.68 (for CHA, STF, and MTW), and $H_2O/SiO_2$=95.

The increase in synthesis temperature from 423 K to 428 K, in the transformations of FAU using STF seeds, had no significant effect on the product crystallinity (X-ray diffractogram, FIG. 10), indicated by no detectable change in diffraction line intensities, yields and Si/Al ratio of the resulting products (Table 2) formed after the same synthesis time (40 h). Further increase of synthesis temperature from 428 K to 433 K, however, drove the transformations to more dense zeolite structure, MFI (X-ray diffractogram, FIG. 10); suggesting the products from these transformations are kinetically trapped. The hypothesis of kinetic trapping of products was also verified by increasing the time of synthesis, which should also drive the transformations further to more dense structures. Products from transformations of FAU using MFI, CHA, STF or MTW seeds converted to denser structures as time proceeded and led to mixtures of dense zeolite phases after 10 days of synthesis (X-ray diffraction patterns; FIG. 11). This data confirm that products of the interzeolite transformations are kinetically trapped structures for a certain set of synthesis conditions and that these structures, with time or temperature, will convert to thermodynamically more stable structures (more dense phases). These transformations, taken together, provide evidence for the key role of Si/Al ratio of the parent zeolite to determine their ability to restructure and form high-silica zeolites, of NaOH to SiO$_2$ ratios of the synthesis gel to ensure the synchronized decomposition of parent and seeds and of temperature and time to kinetically trap the desired structures. Synthesis of high-silica CHA, STF and MTW zeolites support the validity of the synthesis guidelines; further optimizations of the synthesis compositions and conditions are, however, required to form highly crystalline products. We expect that the developed interzeolite transformation protocols for the synthesis of high-silica zeolites can be extended further to zeolites of different frameworks, void environments and framework compositions, based on their framework density and CBU components. This method not only synthesizes zeolites without OSDA, but also forms mesoporous crystals, which are known to improve the accessibility of reactants to the zeolite micropores and thus, have the potential to enhance the turnover rate of reactions and tune the reaction selectivity.

In summary, a method for the synthesis of useful high-silica zeolites such as MFI, CHA, STF, and MTW via OSDA-free interzeolite transformation has been provided. Parent zeolites of low framework densities e.g. FAU or BEA, can be transformed to daughter zeolites of higher framework densities, e.g., MFI, CHA, STF, and MTW via recrystallization in aqueous NaOH at hydrothermal conditions. Successful transformations require that the kinetic hurdles are overcome while exploiting the thermodynamic tendency of microporous solids to increase their framework density. Transformation of BEA to MFI can occur spontaneously without any significant kinetic and thermodynamic hurdles, while the conversion of FAU to MFI, CHA, STF and MTW required product seeds, suggesting the absence of sufficient kinetic driving forces in these cases. The seed-assisted interzeolite transformations were proposed to be pseudomorphic in nature. Such conversions conserve the volume occupied by the parent crystals and lead to similar size and crystal shape in the product zeolites. The incipient nucleation of the new structures occur at the outer regions of the swollen parent crystals and lead to the nucleation of mesoporosity during transformations due to the space-conserving nature of the pseudomorphic transformations and of the higher density of the daughter frameworks. The successful transformations also seemed to require the synchronization of loosening of parent and spalling of seeds, the absence of which lead to amorphous solids. The synthesis mechanism and developed guidelines enable one to design the synthesis conditions of desired zeolites and would expand the diversity of framework types of zeolites that can be synthesized by these methods.

In particular, the present method allows one to make a stable OSDA-free zeolite having a Si/Al above about 7, and even above 10. While the prior art exemplifies the making of materials with a Si/Al of 6 or less without an SDA in the synthesis, products at higher Si/Al are not stable without a SDA filling the empty spaces in the zeolite product, as there are fewer hydrated cations to do so as the overall aluminum content is dropping. Higher Si/Al products also usually have more 5-rings in structure, which do not like aluminum. To the contrary, the present synthesis allows one to make a stable zeolite having a Si/Al greater than 10 without the use of soluble SDA in the synthesis. For example SSZ-35 can be made SDA-free. Such SSZ-35 is loaded with 5-rings and has a Si/Al close to 25. The present synthesis therefore provides one with a more facile and cost effective method for synthesizing high silica zeolites.

The above specification, examples and data provide a complete description of the method of the present invention. Since many additional embodiments of the invention can be made without departing from the spirit and scope of the invention, the invention resides in the claims provided hereto.

What is claimed is:

1. A method of preparing a zeolite having a silica to alumina ratio of at least 10, which comprises:
   a. providing a first zeolite comprising BEA or FAU, and
   b. converting the first zeolite to a second zeolite having a higher framework density than the first zeolite and with the second zeolite having a silica to alumina ratio of at least 10 and comprising a MFI, CHA, STF or MTW zeolite; with the conversion conducted in the absence of an organic structure directing agent (OSDA), with the time for the conversion ranging from about 10 to about 80 hours; the conversion conducted in a solution having a H$_2$O/SiO$_2$ ratio greater than 50 and a NaOH/SiO$_2$ ratio that ranges from 0.25-1.00, and with seed crystals of the second zeolite added to the first zeolite prior to or during the conversion.

2. The method of claim 1, wherein the conversion is achieved by hydrothermal synthesis.

3. The method of claim 1, wherein the conversion is achieved in a basic solution.

4. The method of claim 3, wherein the pH of the basic solution is in the range of from greater than 7 up to 13.

5. The method of claim 4, wherein the pH of the basic solution is in the range of from greater than 7 up to 11.

6. The method of claim 2, wherein the temperature of the conversion is above the crystallization temperature of the first zeolite.

7. The method of claim 1, wherein the temperature of the conversion is in the range of about 130 to about 160° C.

8. The method of claim 1, wherein the silica to alumina ratio of the second zeolite is in the range of from 11 to 25.

9. The method of claim 1, wherein the silica to alumina ratio of the second zeolite is at least 40.

10. The method of claim 1, wherein the second zeolite comprises ZSM-5, SSZ-35, ZSM-12 or chabazite.

11. The method of claim 1, wherein the first zeolite comprises FAU having a silica to alumina ratio of at least 10.

* * * * *